United States Patent [19]
Kawamura et al.

[11] Patent Number: 6,058,241
[45] Date of Patent: *May 2, 2000

[54] PLAYBACK METHOD AND APPARATUS FOR REPRODUCING ENCODED DATA IN A REVERSE PLAYBACK OPERATION

[75] Inventors: Makoto Kawamura; Yasushi Fujinami; Jun Yonemitsu; Tomihiro Nakagawa, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/943,378

[22] Filed: Oct. 3, 1997

Related U.S. Application Data

[63] Continuation of application No. 08/591,909, Jan. 25, 1996.

[30] Foreign Application Priority Data

Jan. 31, 1995 [JP] Japan ................................. 7-032944

[51] Int. Cl.$^7$ .................................................. H04N 5/76
[52] U.S. Cl. .................................................. 386/68; 386/111
[58] Field of Search .................................. 386/6, 7, 8, 33, 386/45, 68, 109, 111, 125–126; 360/8

[56] References Cited

U.S. PATENT DOCUMENTS

| | | |
|---|---|---|
| 4,931,879 | 6/1990 | Koga et al. . |
| 5,305,113 | 4/1994 | Iwamura et al. ........................ 358/312 |
| 5,471,450 | 11/1995 | Yonemitsu et al. ...................... 369/60 |
| 5,481,413 | 1/1996 | Kawada et al. .......................... 360/53 |
| 5,485,279 | 1/1996 | Yonemitsu et al. ...................... 348/411 |
| 5,602,956 | 2/1997 | Suzuki et al. ............................ 386/68 |
| 5,657,086 | 8/1997 | Tahara et al. ............................ 348/412 |
| 5,771,331 | 6/1998 | Aoki et al. ............................... 386/68 |
| 5,841,938 | 11/1998 | Nitta et al. ............................... 386/68 |

FOREIGN PATENT DOCUMENTS

| | | |
|---|---|---|
| 0545323 | 6/1993 | European Pat. Off. . |
| 0634868 | 1/1995 | European Pat. Off. . |

OTHER PUBLICATIONS

F.Pereira et al. "A CCITT Compatible Coding Algorithm for Digital Recording of Moving Images", Signal Processing Image Communication, vol. 2, No. 2, Aug. 1990. Amsterdam NE, pp. 155–169, XP000243475.

*Primary Examiner*—Wendy Garber
*Assistant Examiner*—Aung S. Moe
*Attorney, Agent, or Firm*—Frommer Lawrence & Haug, LLP.; William S. Frommer; Dennis M. Smid

[57] ABSTRACT

Encoded data is reversely reproduced by decoding each picture only once and using only as many frame memory sections as are needed in a normal playback operation. A picture header detector detects a picture header from data read out from a video code buffer to identify the type of picture The picture type information controls a picture data selecting circuit for selecting frames of I and P pictures equal in number to the number of frame memory sections in a frame memory bank. The selected frames are supplied to an inverse VLC circuit to be decoded, starting at the head of a GOP with an I picture. The decoded I and P pictures are stored in the frame memory bank and transmitted to a display unit, starting with the temporally most recent picture and reading backward.

16 Claims, 15 Drawing Sheets

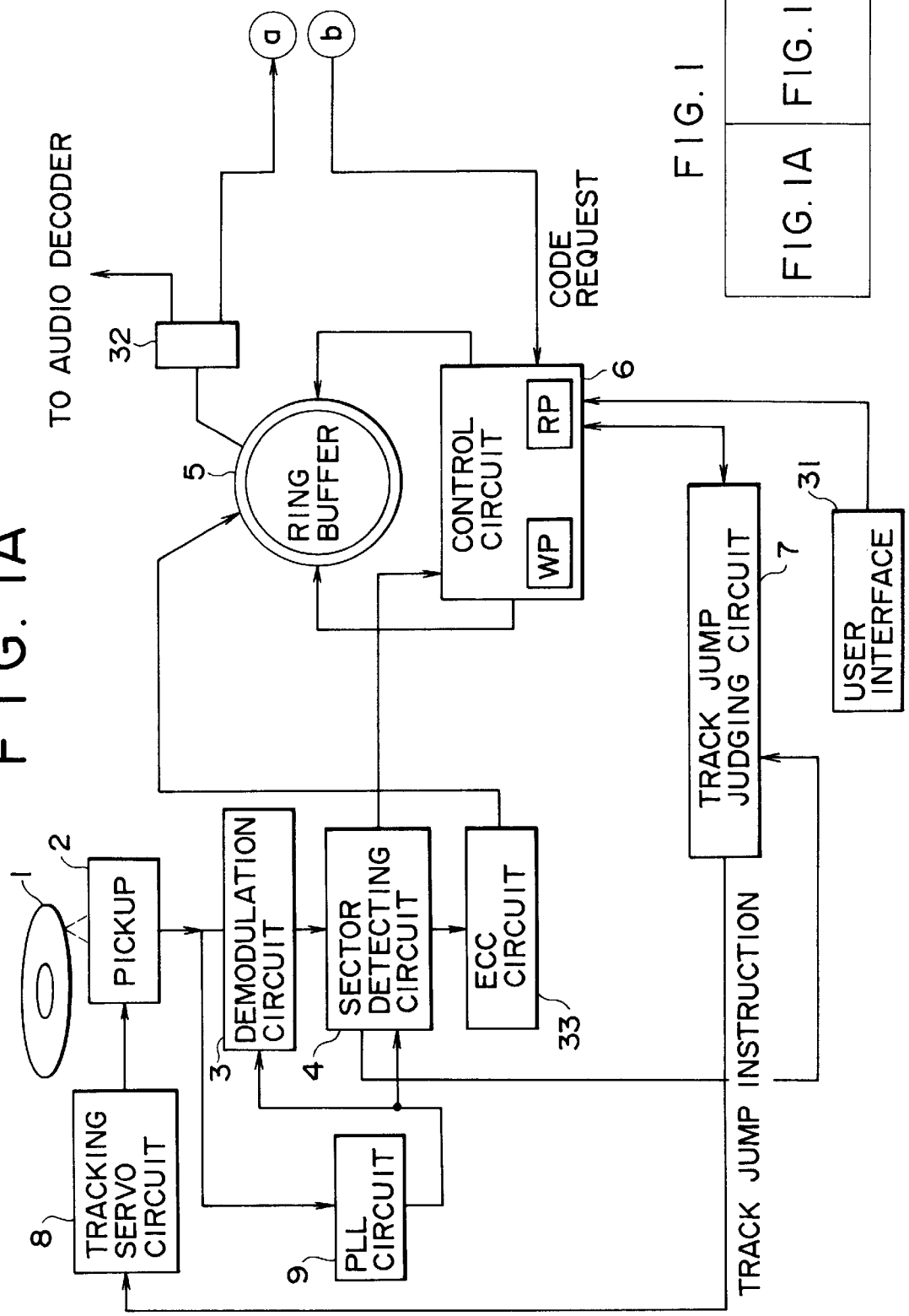

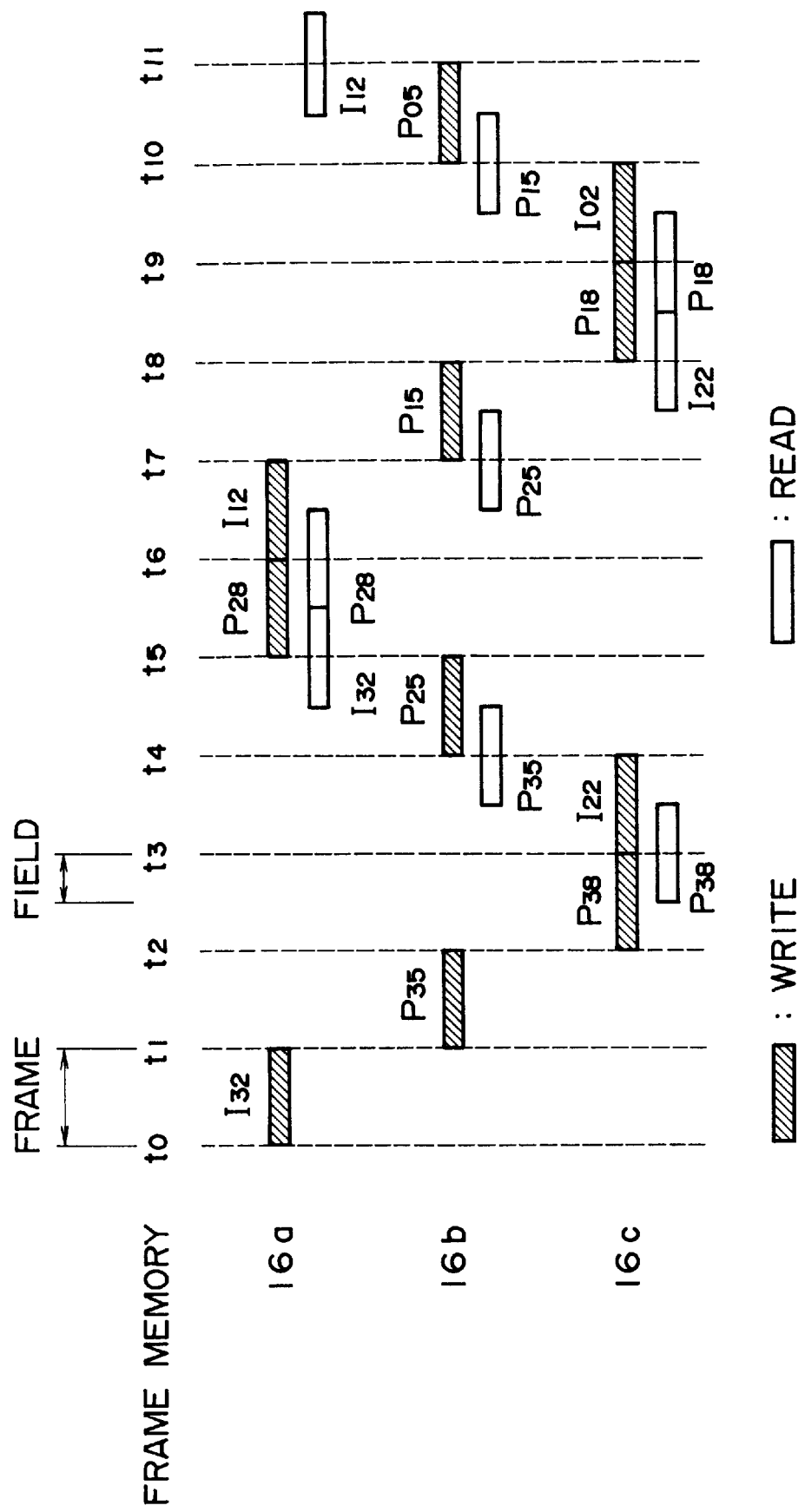

DATA ORDER ON THE DISK

READ ORDER

FIG. 4A
DE-MULTIPLEX
OUT $\overbrace{\text{I22 B20 B21 P25 B23 B24 P28 B26 B27}}^{\text{GOP}}$ I12 B10 B11 P15 B13 B14 P18 B16 B17

[ IDENTIFYING I, P, AND B AND SKIPPING B ] →→

FIG. 4B
WRITING INTO
DECODER MEMORY

I22    P25    P28    I12    P15    P18

FIG. 4C
PICTURE
DISPLAYING ORDER
(DECODER OUTPUT)

P28    P25    P18    I22    P15    I12

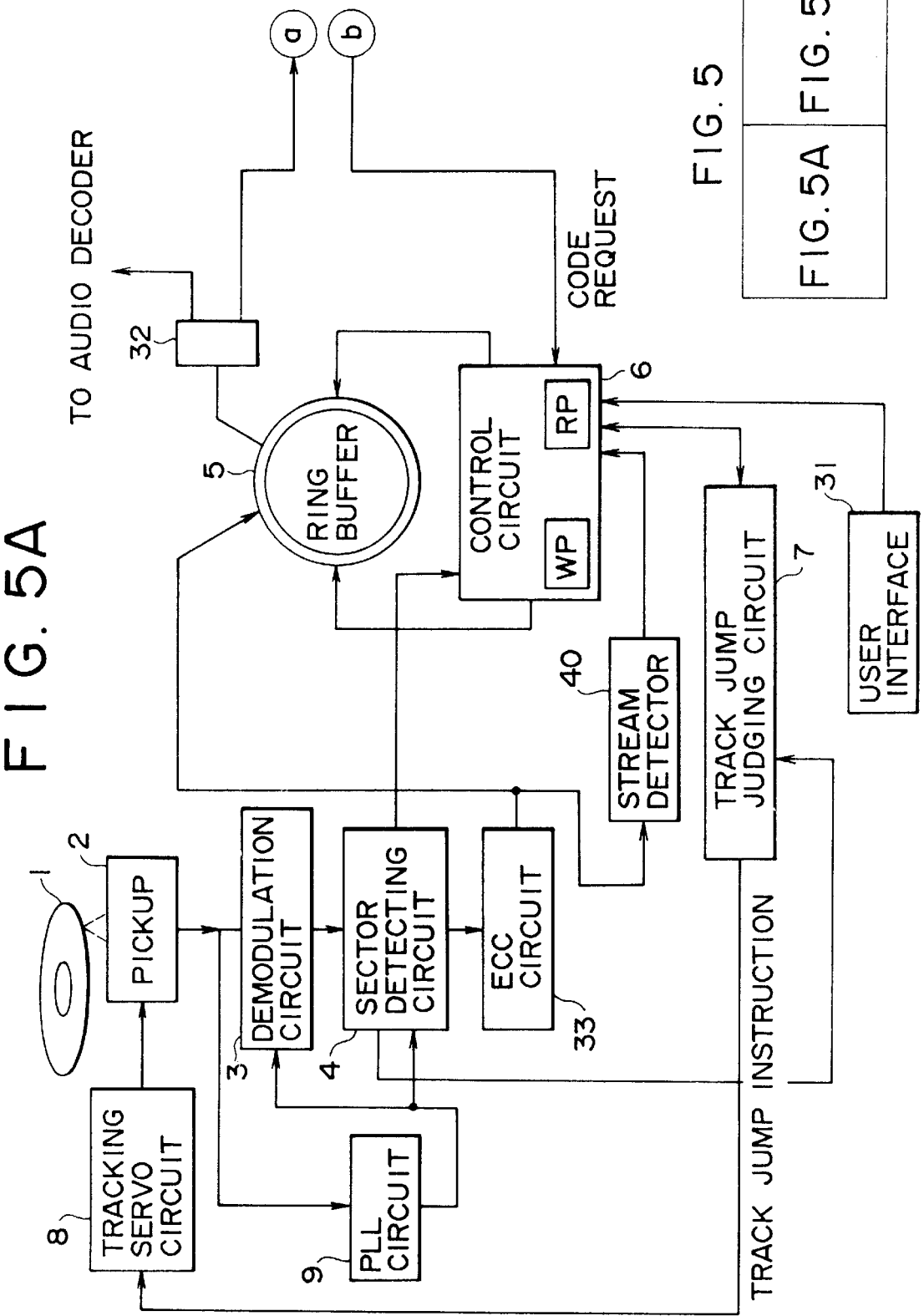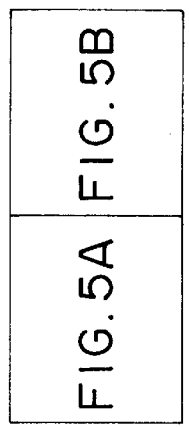

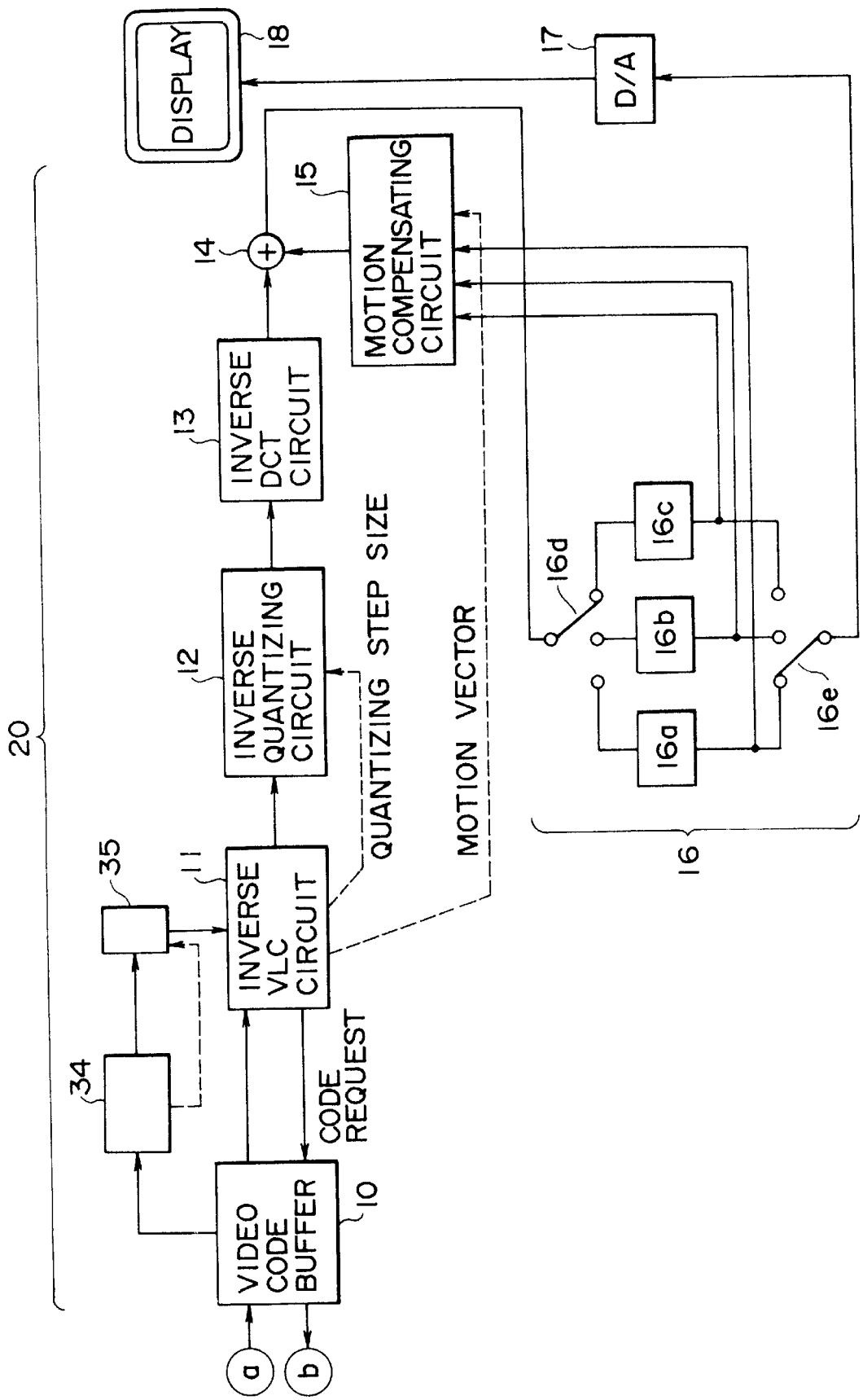

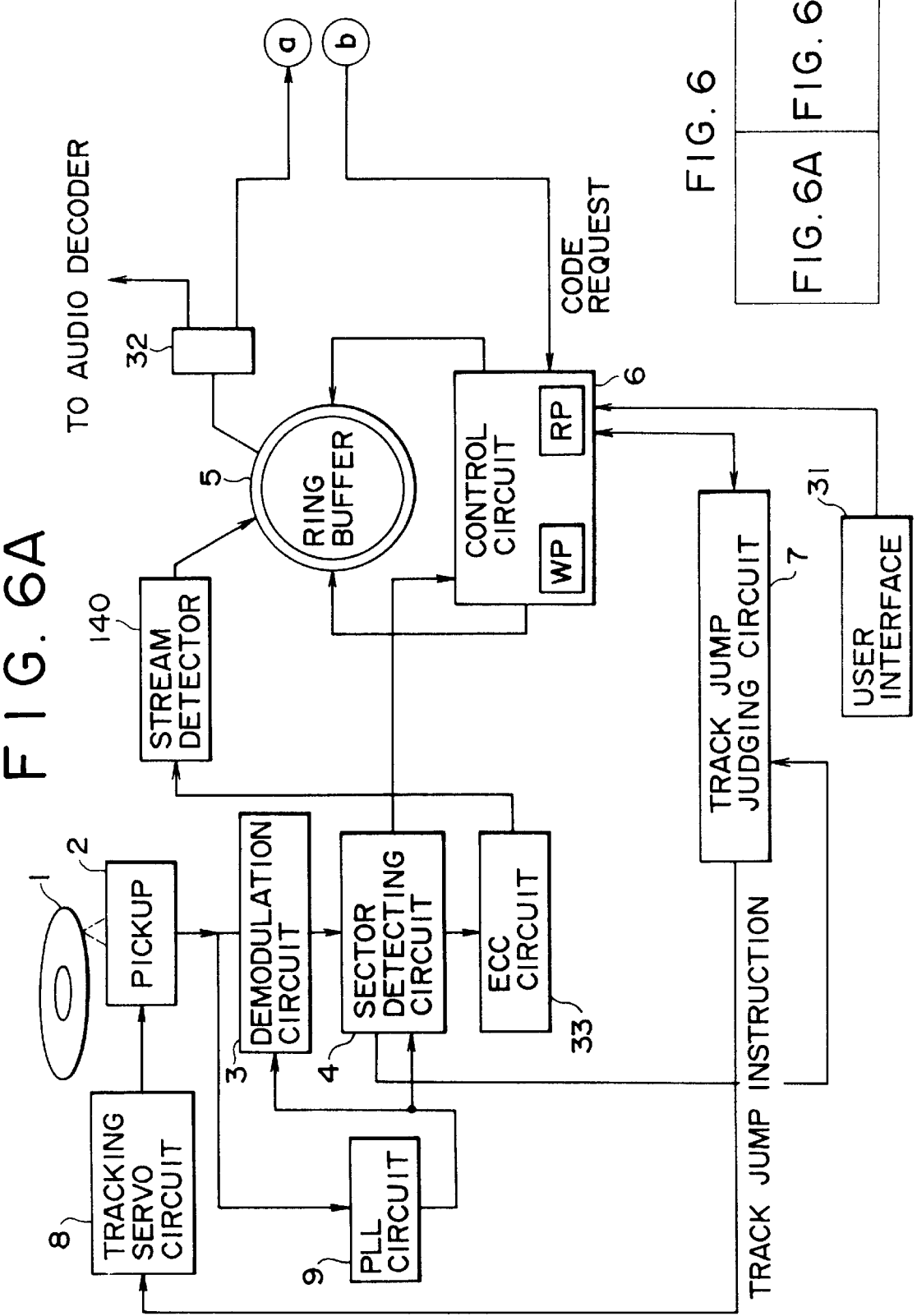

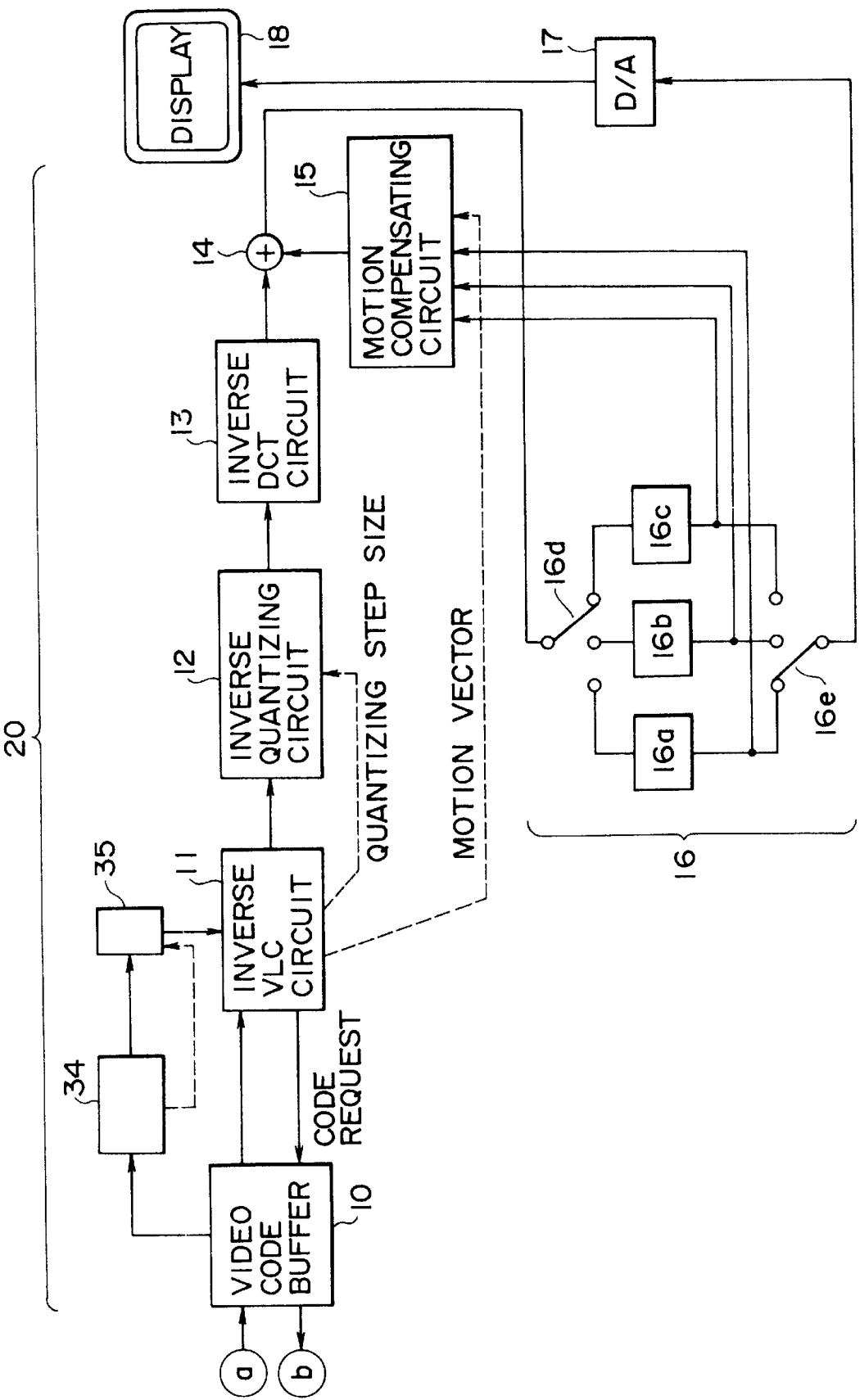

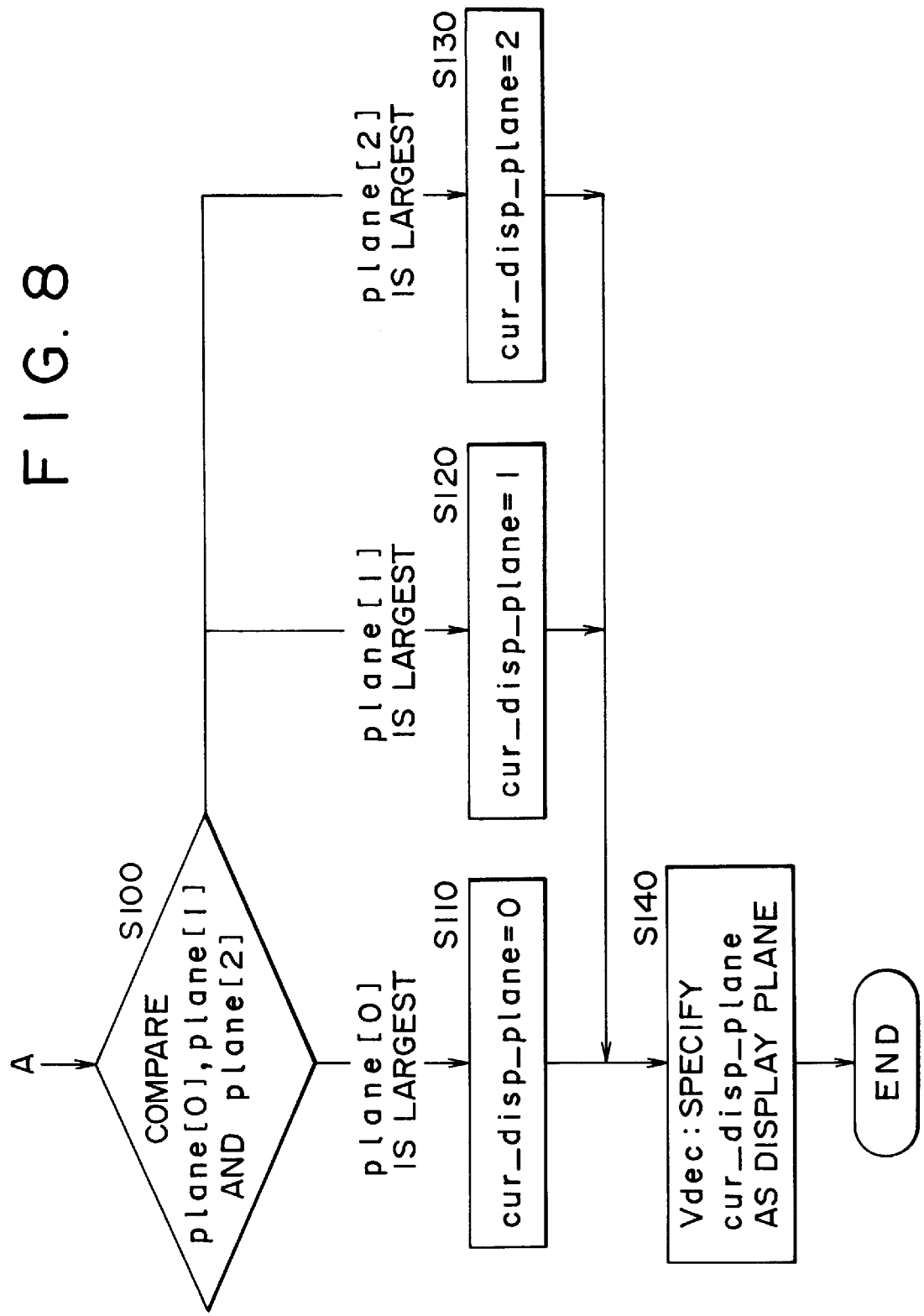

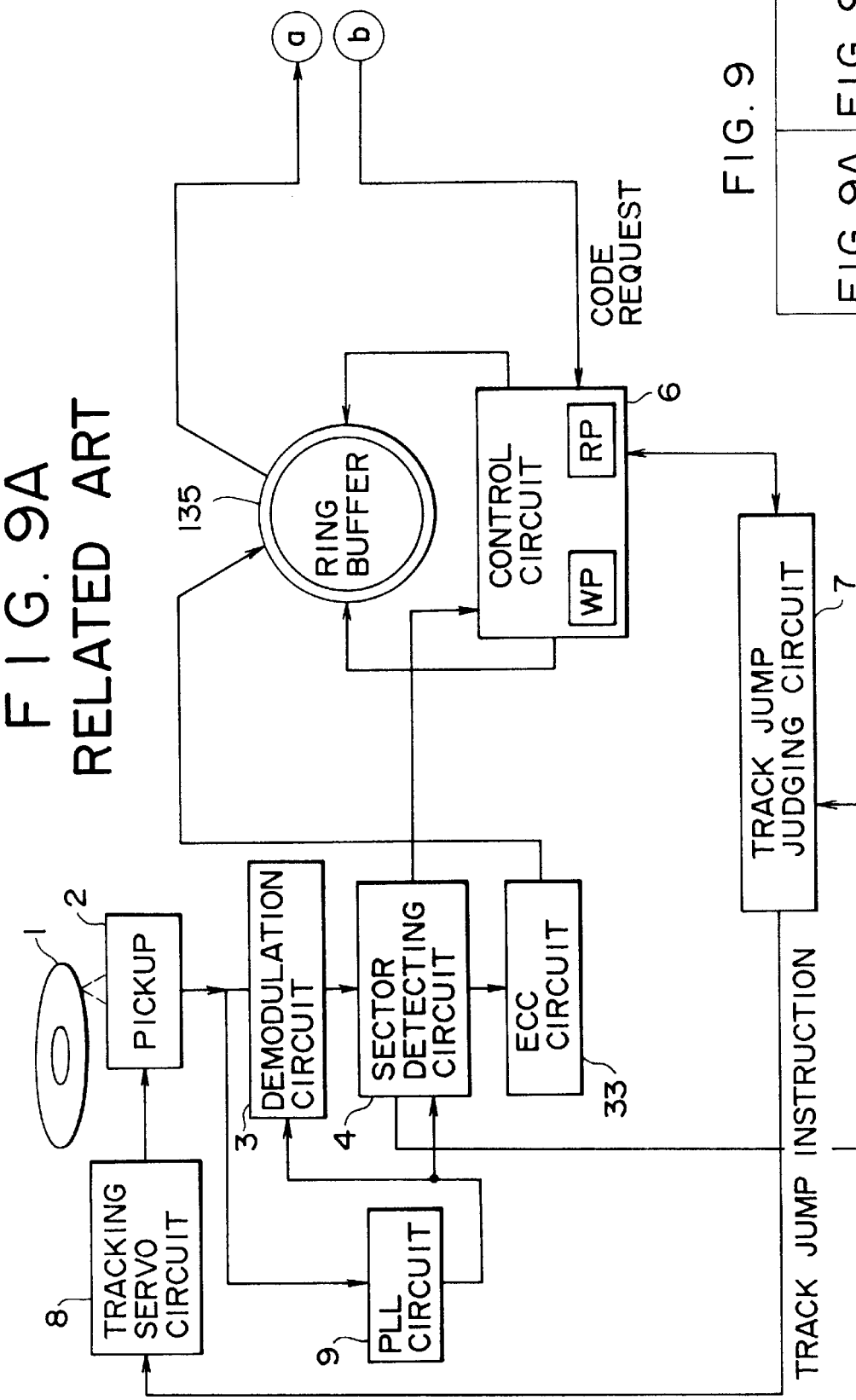

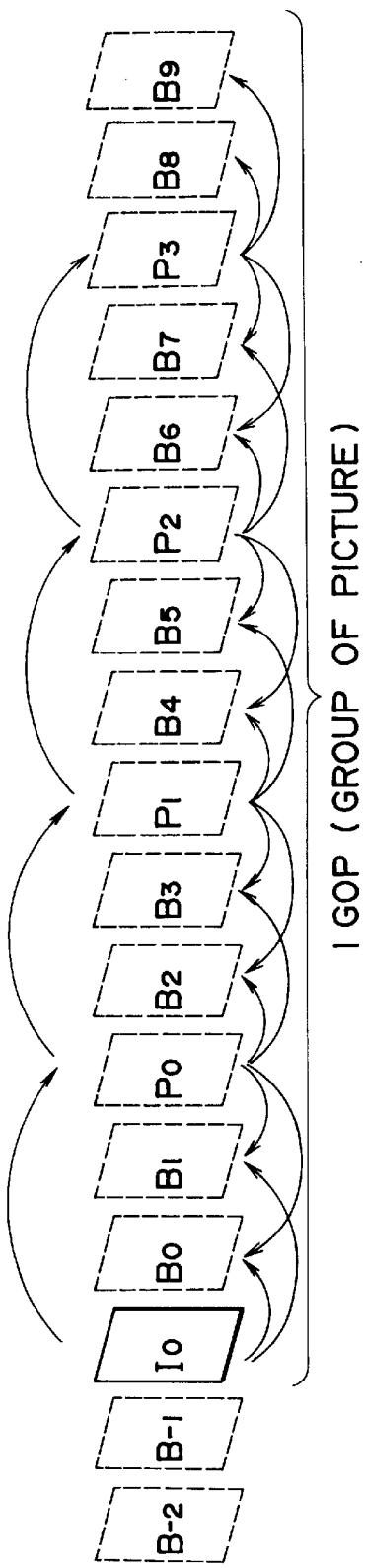
FIG. 10A RELATED ART   PREDICTION STRUCTURE OF FRAMES
FIG. 10B RELATED ART   STRUCTURE OF RECORDED FRAMES

PLAYBACK METHOD AND APPARATUS FOR REPRODUCING ENCODED DATA IN A REVERSE PLAYBACK OPERATION This application is a continuation of application Ser. No. 08/591,909, filed on Jan. 25, 1996.

BACKGROUND OF THE INVENTION

The present invention relates to an encoded data playback method and apparatus for reproducing video and audio data recorded in a recording medium such as an optical disc or a magnetic disc.

The MPEG (Moving Picture Expert Group) standard is a technique for compressing/encoding a digital video signal to be recorded in a recording medium, such as a digital video disc (DVD).

The prediction structure of video picture frames compressed according to the MPEG standard is shown in FIG. 10A. A Group of Pictures (GOP) typically is comprised of 15 frames. The typical GOP includes an I picture, four P pictures and ten B pictures. A GOP is an encoding unit used to divide a sequence of moving pictures.

An I picture is a picture resulting from an intraframe encoding process. A P picture is a predictively encoded picture resulting from an interframe forward-direction predictive encoding process referencing a frame of an I picture or a P picture previously encoded. A B picture is a predictively encoded picture resulting from an interframe bi-direction predictive encoding process referencing an I or P frame preceding and an I or P frame succeeding the B picture.

The referencing of frames in the predictive encoding process is indicated by arrows in FIG. 10A. I picture $I_0$ is encoded by referencing the contents of the frame itself in an intraframe encoding process. P picture $P_0$ is predictively encoded by referencing the I picture $I_0$. B pictures $B_0$ and $B_1$ are predictively encoded by referencing I picture $I_0$ and P picture $P_0$. B pictures $B_2$ and $B_3$ are predictively encoded by referencing P pictures $P_0$ and $P_1$. Subsequent pictures are created through the same predictive encoding process.

In the decoding process, an I picture is decoded from data of the I picture itself. A P picture is decoded using data from the previous I or P picture depending on the picture type used to encode the P picture. Similarly, a B picture is decoded using data from the preceding and succeeding I and/or P pictures depending upon the picture types used to encode the B picture.

To enable a smooth decoding process, the pictures are rearranged prior to decoding as shown in FIG. 10B so that those pictures that are required to decode a P or B picture have been previously decoded. I picture $I_0$ is required to decode B pictures $B_{-1}$ and $B_{-2}$; therefore, the pictures are rearranged so that I picture $I_0$ precedes B pictures $B_{-1}$ and $B_{-2}$ as shown in FIG. 10B, even though the original temporal sequence of B pictures $B_{-1}$ and $B_{-2}$ had preceded I picture $I_0$. I picture $I_0$ and P picture $P_0$ are required to decode B pictures $B_0$ and $B_1$, so P picture $P_0$ is rearranged to precede B pictures $B_0$ and $B_1$. P pictures $P_0$ and $P_1$ are required to decode B pictures $B_2$ and $B_3$, so P picture $P_1$ is rearranged to precede B pictures $B_2$ and $B_3$. P pictures $P_1$ and $P_2$ are required to decode B pictures $B_4$ and $B_5$, so P picture $P_2$ is rearranged to precede B pictures $B_4$ and $B_5$. P pictures $P_2$ and $P_3$ are required to decode B pictures $B_6$ and $B_7$, so P picture $P_3$ is rearranged to precede B pictures $B_6$ and $B_7$.

The rearranged I, P and B pictures, shown in FIG. 10B, are recorded in a DVD. Since these pictures are compressed and encoded according to the MPEG standard, the size of the resulting code is not fixed and varies from picture to picture. More specifically, the size of the code differs depending upon the complexity and the flatness of the picture. The code of the picture is recorded in sectors of a DVD, each sector accommodating a fixed amount of code.

The codes are recorded in these sectors as shown in FIG. 11. The code of I picture $I_0$ is recorded in sector m, sector (m+1) and a portion of sector (m+2). The code of B picture $B_{-2}$ is recorded in the remaining portion of sector (m+2) and in sector (m+3). Thus, the code of each picture is recorded successively in sectors of a DVD by dividing the encoded data. In this example, the code of a GOP is recorded in sectors m to (m+21).

The code of a GOP is not normally recorded in a fixed number of sectors. Since the size of the code differs depending upon the complexity and the flatness of the picture, the number of sectors required to record the code of a GOP is generally different for each GOP.

A configuration of a data playback apparatus for reproducing data from a DVD which was compressed and encoded according to the MPEG standard is shown in FIGS. 9A and 9B.

In FIG. 9A, an optical disc 1 is controlled to rotate at a predetermined rotational speed by a spindle motor (not shown). A laser light generated by a pickup 2 is applied to a track of the optical disc to read out digital data recorded on a track of the DVD. The reproduced digital data is EFM-demodulated by a demodulation circuit 3 and then supplied to a sector detecting circuit 4. The output of the pickup is also supplied to a phase locked loop (PLL) circuit 9 to reproduce a clock signal. The reproduced clock signal is supplied from the PLL circuit to the demodulation circuit and the sector detecting circuit.

The digital data was recorded on the optical disc in sector units which have a fixed length, as shown in FIG. 11. A sector synchronization code and a sector header are added, during recording, at the head of each sector. The sector detecting circuit detects a sector delimiter from the sector synchronization code and simultaneously detects information such as a sector address from the sector header. The detected information is supplied to a control circuit 6.

A signal output by demodulation circuit 3 is supplied to an Error Checking and Correction (ECC) circuit 33 through sector detecting circuit 4 to detect and correct errors. The error corrected data is supplied from the ECC circuit to a ring buffer 135 whereat the data is written to a location in the ring buffer under control of the control circuit.

The focus control and the track control of pickup 2 are carried out by a focus servo circuit (not shown) and a tracking servo circuit 8 as a function of focus and tracking error signals obtained from information read out by the pickup.

Control circuit 6 specifies a write address in ring buffer 135 via write pointer WP, to which data read from optical disc 1 is to be written, according to a sector address of the sectors detected by sector detecting circuit 4. In addition, the control circuit specifies a read address via read pointer RP, from which data is read out of the ring buffer, in response to a code request signal received from a video code buffer 10, shown in FIG. 9B. The data located in the address specified by read pointer RP is read out and stored in the video code buffer.

The data stored in the video code buffer is supplied to an inverse variable length coding (VLC) circuit 11 in response to a code request signal received from the inverse VLC circuit. The inverse VLC circuit carries out inverse VLC processing on the data, which is then supplied to an inverse quantizing circuit 12. At this time, another code request signal requesting new data is sent from the inverse VLC circuit to the video code buffer to continue the decoding process.

The inverse VLC circuit also outputs a quantizing step size to the inverse quantizing circuit and motion vector information to a motion compensating circuit 15. Data input to the inverse quantizing circuit had been quantized according to the quantizing step size and the inverse quantized data is supplied to an inverse discrete cosine transform (DCT) circuit 13. The data, which had been DCT processed before recording on optical disc 1, undergoes inverse DCT processing in the inverse DCT circuit and is supplied to an addition circuit 14.

The addition circuit adds the signal output by the inverse DCT circuit to the signal output by the motion compensating circuit. The signal output from the motion compensating circuit depends on the type of signal being decoded, i.e., either an I, P or B picture. The signal output from the addition circuit is supplied to a frame memory bank 16. The frame memory bank is composed of three frame memories 16a, 16b, 16c and two switches, one upstream of the frame memories 16d and one downstream of the frame memories 16e.

Data is then read from the frame memory bank so that the data is arranged in the original frame order, as shown in FIG. 10A. The data read from the frame memory bank is converted by a digital-to-analog (D/A) converter 17 into an analog video signal which is displayed on a display unit 18.

An example of playing back the recorded frames shown in FIG. 10B is discussed below When the I picture is decoded, the signal output by inverse DCT circuit 13 is transmitted to frame memory bank 16 as it is since the I picture did not undergo interframe predictive encoding. When a P or B picture is decoded, previously decoded I and/or P pictures referenced during the interframe predictive encoding of the P or B picture are transmitted from the frame memory bank to motion compensating circuit 15 to create a predicted motion picture according to the motion vector information supplied from inverse VLC circuit 11. The predicted motion picture is then supplied to addition circuit 14. The addition circuit adds the signal output by the motion compensating circuit to the signal output by the inverse DCT circuit. The output of the addition circuit is stored in the frame memory bank, as described above.

As discussed above, control circuit 6 supplies data stored in ring buffer 135 to video code buffer 10 in response to a code request signal received from the video code buffer. When the amount of data transferred from the video code buffer to the inverse VLC circuit decreases while the data processing of simple pictures is taking place, the amount of data transferred from the ring buffer to the video code buffer also decreases. Therefore, the amount of data stored in the ring buffer will increase and could cause write pointer WP to move ahead of read pointer RP. In such a state, an overflow occurs in the ring buffer.

To avoid an overflow state, the amount of data currently stored in the ring buffer is computed from the address positions of write pointer WP and read pointer RP which are controlled by the control circuit. When the amount of data exceeds a preset reference value, a track jump judging circuit 7 determines that an overflow may occur in the ring buffer. At this time, the track jump judging circuit outputs a track jump instruction to a tracking servo circuit 8.

The rate of transferring data from ring buffer 135 to video code buffer 10 is set at a value equal to or smaller than the rate of transferring data from ECC circuit 33 to the ring buffer. This rate limitation allows a request to transfer data from the video code buffer to the ring buffer to be transmitted regardless of the timing of a track jump.

In the data playback apparatus shown in FIGS. 9A and 9B, pickup 2 is controlled to perform track jumps according to the storage capacity of the ring buffer. As a result, an overflow or an underflow can be prevented from occurring in the ring buffer regardless of the complexity or flatness of pictures recorded on optical disc 1, thereby allowing continuous playback of pictures with a uniform quality.

In a reverse playback operation starting from, for example, P picture $P_3$, it is necessary to display pictures decoded in the following order: $P_3$, $B_7$, $B_6$, $P_2$, $B_5$, $B_4$, $P_1$, $B_3$, $B_2$, $P_0$, $B_1$, $B_0$, $I_0$ . . . However, since P pictures have undergone interframe predictive encoding, the decoding of P picture $P_3$ requires the previous decoding of pictures $I_0$, $P_0$, $P_1$ and $P_2$ Furthermore, to decode B picture $B_7$, P pictures $P_2$ and $P_3$ must have been previously decoded. As a result, in order to carry out a reverse playback operation by decoding each picture only once, a frame memory bank which can store as many frames as there are pictures in a GOP is required.

To carry out a reverse playback operation, the frame memory bank 16 must be expanded to increase its storage capacity. This permits the frame memory bank to sequentially accumulate decoded data and transmit pictures in a reverse playback order.

In addition, it is also possible to reproduce only I and P pictures, in reverse, by skipping the B pictures. However, such reproduction still requires the storage of a large number of frames. Therefore, to decode video data, in reverse, which has been compressed using temporal picture correlation, that is, picture correlation in the time axis direction, such as the MPEG compression technique, two or three additional portions of frame memory are required for the reverse playback operation. This additional memory increases the size and cost of the circuit. Additionally, the amount of power consumed and heat dissipated increases, which makes it necessary to increase the size and capacity of the heat radiating means.

OBJECTS AND SUMMARY OF THE INVENTION

It is an object of the present invention to provide a playback method and a playback apparatus for reproducing encoded data for carrying out a reverse playback operation which uses no more than the same amount of frame memory required in a normal playback operation. Consequently, the problems discussed above are obviated.

According to the present invention, a reverse playback operation can be carried out by using the same frame memory bank used in a normal playback operation. Therefore, the playback apparatus for reproducing encoded data capable of performing the reverse playback operation can be implemented at a low cost. Since playback operations such as reverse playback can be carried out by means of a small scale circuit, the size of the circuit boards and the playback apparatus for reproducing encoded data can be reduced.

Additionally, since the amount of power consumed can be reduced, the amount of heat dissipated can also be reduced. Thus, the size of the apparatus can be reduced because the size of the configuration for radiating the dissipated heat can be minimized. As a result, a reverse playback operation can be implemented in portable playback apparatus.

Other objects, features, and advantages according to the present invention will become apparent from the following detailed description of illustrated embodiments when read in conjunction with the accompanying drawings in which the same components are identified by the same reference numerals

BRIEF DESCRIPTION OF THE DRAWINGS

FIGS. 1A and 1B show the configuration of an embodiment of the present invention for reproducing encoded data;

FIG. 2 shows write and read timings of frame memories employed in an embodiment of the present invention for reproducing encoded data;

FIGS. 4A, 4B and 4C show the order in which recorded data is read from the disc and displayed for reproducing encoded data in a reverse playback operation;

FIGS. 5A and SB show the configuration of another embodiment of the present invention for reproducing encoded data;

FIGS. 6A and 6B show the configuration of a modified version of the embodiment shown in FIGS. 5A and 5B;

FIG. 8 is the remainder of the flow chart shown in FIG. 7;

FIGS. 9A and 9B show a configuration of a playback apparatus for reproducing encoded data;

FIGS. 10A and 10B are useful in understanding how video frames are compressed and recorded according to the MPEG standard.

DETAILED DESCRIPTION OF THE PREFERRED EMBODIMENTS

Figure 1B:
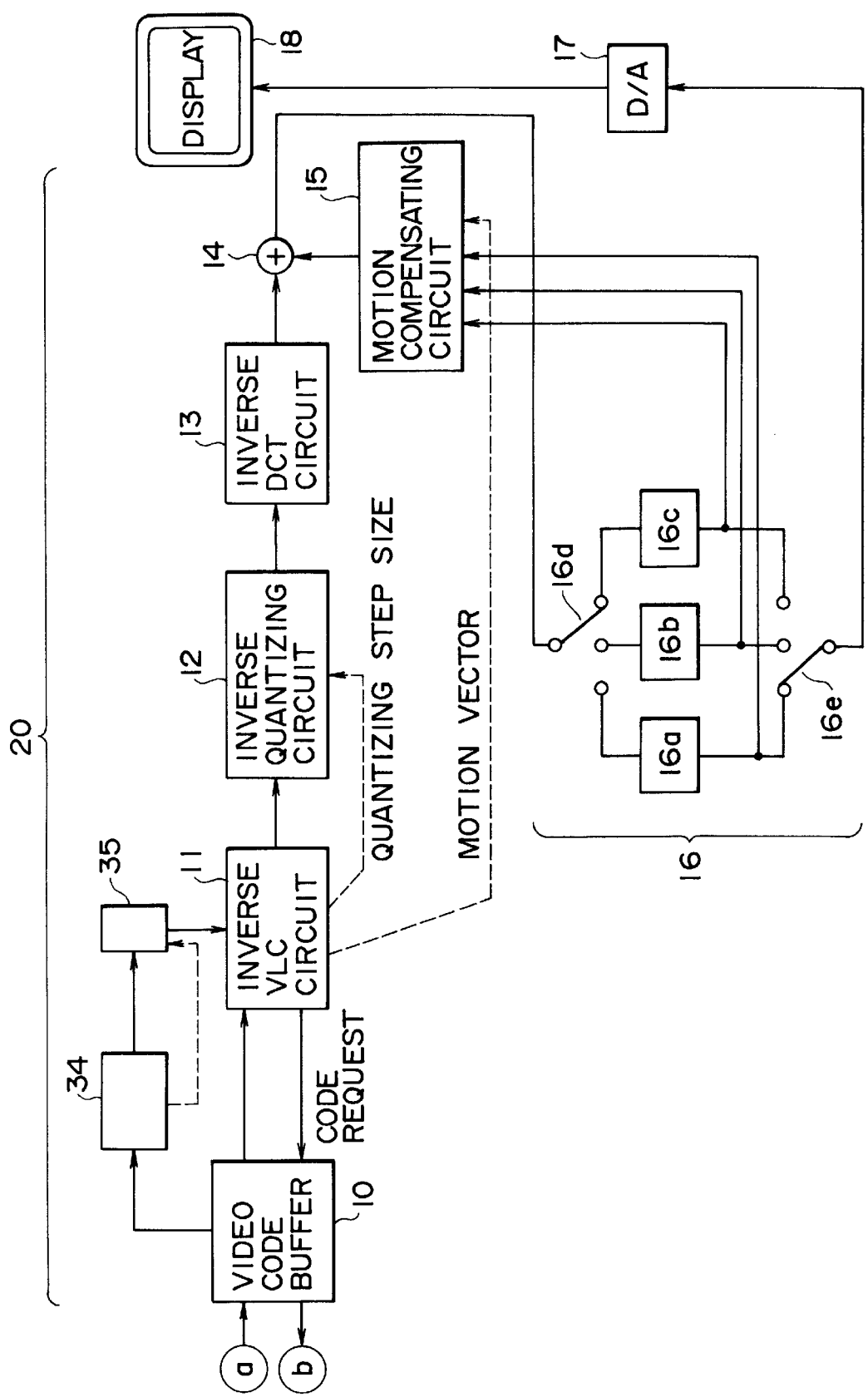

FIG. 1 shows the configuration of an embodiment of a playback apparatus according to the present invention.

In the embodiment shown in FIG. 1, an optical disc 1 is controlled to rotate at a predetermined rotational speed by a spindle motor (not shown). A laser light generated by a pickup 2 is applied to a track of the optical disc to read out the digital data recorded on the track. Before being recorded the digital data was encoded and compressed according to the MPEG standard. The reproduced digital data is EFM-demodulated by a demodulation circuit 3 and supplied to a sector detecting circuit 4. In addition, the output of the pickup is supplied to a PLL circuit 9 for reproducing a clock signal. This reproduced clock signal is supplied to the demodulation circuit and the sector detecting circuit.

Figure 11:
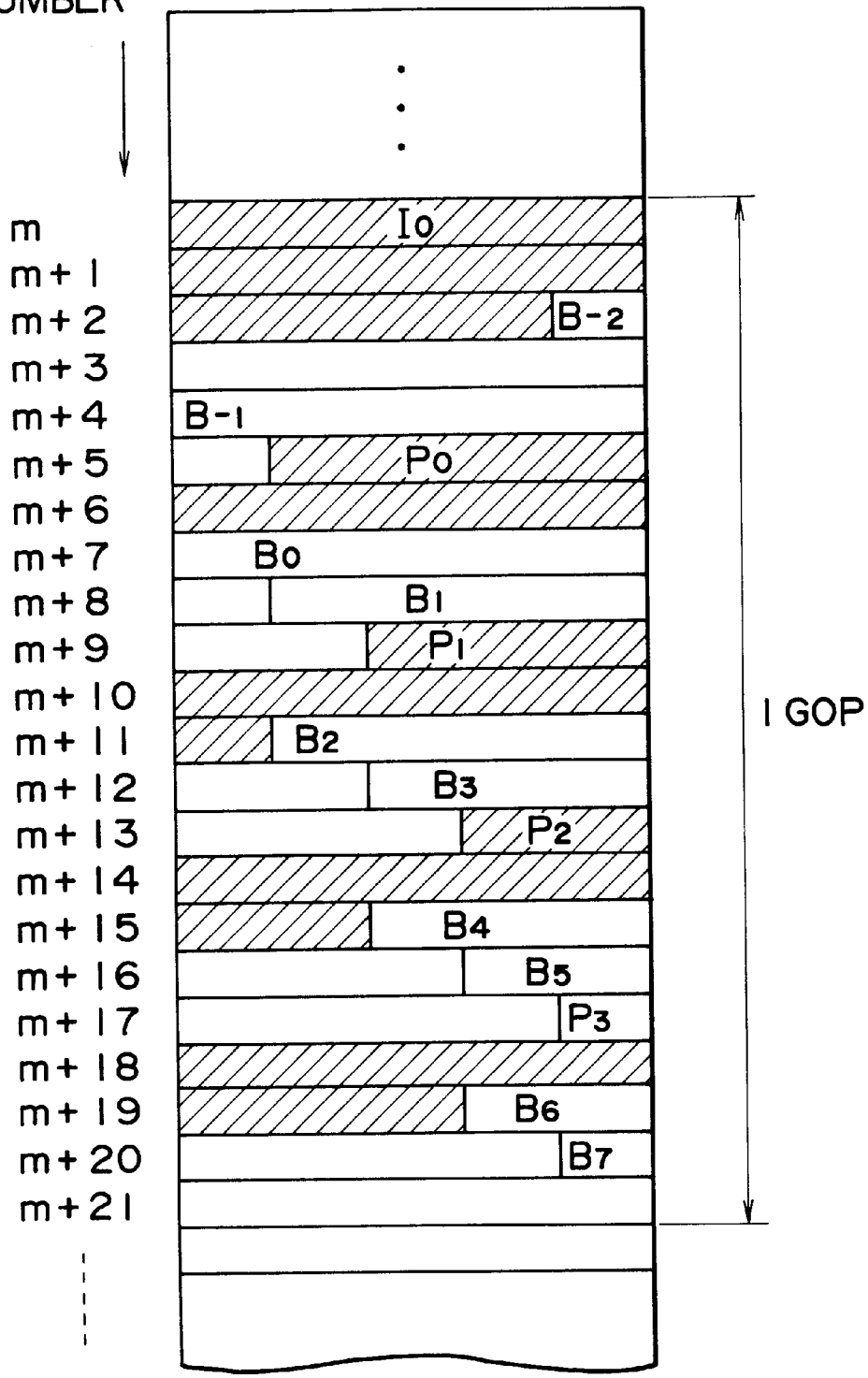
FIG. 11 represents sectors of compressed video pictures recorded on a DVD.

The digital data was recorded in the optical disc in sector units which have a fixed length, as shown in FIG. 11, and a sector synchronization code and a sector header were added at the head of each sector. The sector detecting circuit detects a sector delimiter from the sector synchronization code and simultaneously detects information, such as a sector address, from the sector header. This information is then supplied to a control circuit 6.

A signal output by demodulation circuit 3 is supplied to an ECC circuit 33 through sector detecting circuit 4 to detect and correct errors. The error corrected data is supplied from the ECC circuit to a ring buffer 5 wherein the data is written to a location under the control of control circuit 6.

Focus control and track control of pickup 2 are carried out respectively by a focus servo circuit (not shown) and a tracking servo circuit 8 based on focus and tracking error signals obtained from the information read from the optical disc by the pickup.

The control circuit specifies a write address in ring buffer 5 via write pointer WP, to which sector data read from the optical disc is to be written, according to sector addresses of the sectors detected by sector detecting circuit 4. In addition, the control circuit specifies a read address via read pointer RP, from which data is read from the ring buffer, in response to a code request signal received from a video code buffer 10, shown in FIG. 1B. The data located in the address specified by read pointer RP is read out and supplied to a demultiplexer 32.

The data recorded on optical disc 1 was encoded in a process in which audio and video data were multiplexed with each other. The demultiplexer separates the audio data from the video data and supplies the latter to a video decoder 20, shown in FIG. 1B, and the former to an audio decoder (not shown). Thus, video data read from ring buffer 5 is extracted and stored in video code buffer 10.

The data stored in the video code buffer is supplied to a picture header detector 34 for detecting from information in the picture headers whether the picture is an I, P or B picture and temporal information indicating a frame order in the GOP, such as the frames shown in FIG. 10B. The detected picture type information is supplied to a picture data selecting circuit 35. In a special playback operation, such as reverse playback, the picture type information output by the picture header detector is used to select only I and P pictures which are supplied to an inverse VLC circuit 11, thus, skipping B pictures.

In a normal playback operation, the picture data selecting circuit is controlled to output all pictures without discriminating any particular ones. This control is carried out by a system controller (not shown).

The inverse VLC circuit carries out inverse VLC processing on the data and supplies it to an inverse quantizing circuit 12. Simultaneously, a code request signal requesting new data to be supplied to the inverse VLC circuit is sent by the inverse VLC circuit to the video code buffer.

Furthermore, the inverse VLC circuit outputs a quantizing step size to the inverse quantizing circuit and motion vector information to a motion compensating circuit 15. The data input to the inverse quantizing circuit is dequantized based on the quantizing step size and then supplied to an inverse DCT circuit 13. The inverse DCT circuit carries out inverse DCT processing on the dequantized data and supplies the recovered data to an addition circuit 14.

The signal output by the inverse DCT circuit and the signal output by the motion compensating circuit according to whether the signal to be decoded is an I, P or B picture are added in the addition circuit. The resulting signal is supplied to a frame memory bank 16 from the addition circuit.

Data is then read from the frame memory bank so that the data is rearranged in the original frame order, for example, as shown in FIG. 10A. The data read from the frame memory bank is converted by a digital-to-analog (D/A) converter 17 into an analog video signal which is displayed on a display unit 18.

As described above, control circuit 6 supplies data stored in ring buffer 5 to video code buffer 10 in response to the code request signal received from the video code buffer. When the amount of data transferred from the video code buffer to inverse VLC circuit 11 decreases while the data of simple pictures is processed, the amount of data transferred from the ring buffer to the video code buffer also decreases. Therefore, the amount of data stored in the ring buffer increases and can cause write pointer WP to move ahead of read pointer RP. In such a state, an overflow occurs in the ring buffer.

The amount of data currently stored in the ring buffer is computed from the address positions of write pointer WP and read pointer RP which are controlled by control circuit 6. When the amount of data exceeds a preset reference value, a track jump judging circuit 7 determines that an overflow may occur in the ring buffer, therefore, a track jump instruction is output to a tracking servo circuit 8.

The rate of transferring data from ring buffer 5 to video code buffer 10 is set at a value equal to or smaller than the rate of transferring data from ECC circuit 33 to the ring buffer. Thereby, a request to transfer data from the video code buffer to the ring buffer can be transmitted regardless of the timing of a track jump.

In the data playback apparatus shown in FIGS. 1A and 1B, pickup 2 is controlled to perform track jumps based on the storage capacity of the ring buffer. As a result, an overflow or an underflow can be prevented from occurring in the ring buffer regardless of the complexity or flatness of the picture recorded on optical disc 1. This procedure provides for continuous playback of pictures with a uniform quality.

Figure 3A:
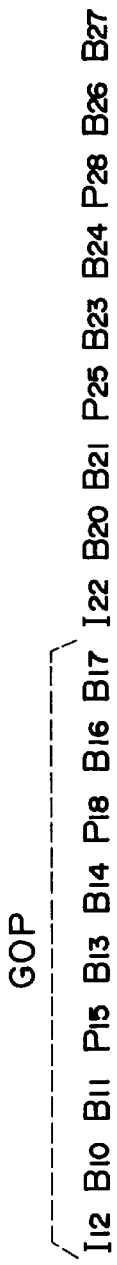
FIGS. 3A and 3B show the order in which recorded data is read from a disc in order to reproduce encoded data.

A normal playback operation for reproducing video data recorded on the optical disc is described below. Data of I, P and B pictures $I_{12}$, $B_{10}$, $B_{11}$, $P_{15}$, $B_{13}$, $B_{14}$, . . . is recorded in the optical disc in an order shown in FIG. 3A. In this example, the GOP comprises an I-picture, two P-pictures and six B-pictures.

Figure 3B:
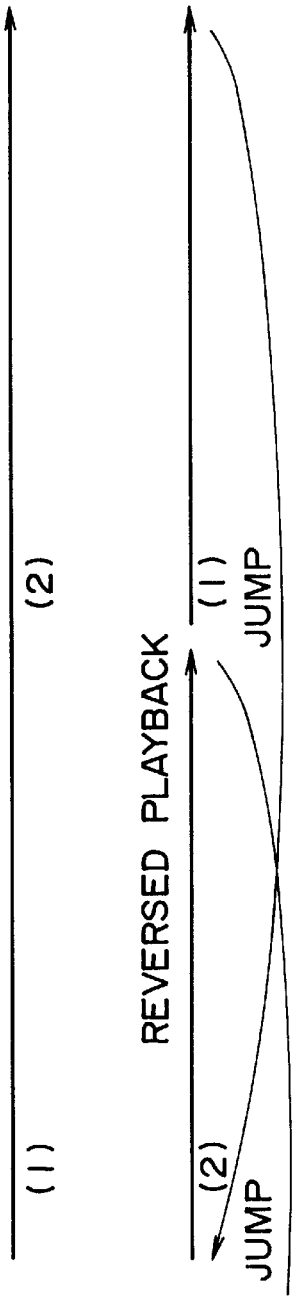

In a normal playback operation, encoded data is read out and sequentially decoded in the order the data was recorded, as indicated by an arrow (1) shown in FIG. 3B.

More specifically, when decoding I picture $I_{12}$, the signal output by inverse DCT circuit 13 is transmitted to frame memory bank 16 as it is since it was intraframe encoded. B picture $B_{10}$, is decoded using a previously decoded P picture and I picture $I_{12}$ referenced during the interframe predictive encoding of the B picture $B_{10}$, these I and P pictures being transmitted from the frame memory bank to motion compensating circuit 15 to create a predicted motion picture using the motion vector information supplied from inverse VLC circuit 11. Addition circuit 14 adds the signal output by the motion compensating circuit to the signal output by the inverse DCT circuit. The resulting signal is stored in the frame memory bank.

Similarly, B picture $B_{11}$ is decoded in a like manner and the resulting data is stored in the frame memory bank by overwriting the picture recovered from B picture $B_{10}$. In decoding P picture $P_{15}$, I picture $I_{12}$ is transmitted from the frame memory bank (where it remained) to the motion compensating circuit and a decoding process similar to that described above for decoding a B picture is implemented. The decoded P picture $P_{15}$ is stored in the frame memory bank by overwriting the data of less recent I and P pictures.

Next, a reverse playback operation will be explained. In a reverse playback operation, data is decoded and displayed in the opposite order as compared to the original order of the data that was recorded on optical disc 1. For example, data stored in the order shown in FIG. 3A would be decoded starting with B picture $B_{17}$. In this example, P pictures $P_{15}$ and $P_{18}$, which were referenced in the compression and encoding process of B picture $B_{17}$, must be decoded before B picture $B_{17}$ is decoded. In order to obtain P picture $P_{15}$, however, it is further required that I picture $I_{12}$ be decoded. Therefore, B picture $B_{17}$ must be decoded by decoding the pictures sequentially starting with I picture $I_{12}$ at the head of the GOP.

Likewise, pictures $B_{16}$, $P_{18}$, $B_{14}$, $B_{13}$, $P_{15}$, . . . are decoded by sequentially decoding pictures starting with I picture $I_{12}$ at the head of the GOP.

If, for example, frame memory bank 16 can only store up to three frames, it is impossible to store all of the decoded pictures starting at the head of the GOP. This lack of storage space makes it necessary to repeatedly decode pictures starting with the I picture at the head of the GOP in order to decode a moving picture in the reverse playback operation.

When the process of decoding a GOP, such as GOP(1), is completed, the flow of the operation jumps to the head of the immediately preceding GOP(2) as shown by the JUMP arrow of FIG. 3B to read data therefrom and to decode the data in the manner described above.

If a reverse playback operation is carried out by decoding pictures in this manner, the process of sequentially decoding data starting with the I picture at the head of the GOP must be carried out repeatedly. This repeated decoding results in a time delay in displaying pictures during the reverse playback operation. Thus, the pictures would be displayed unnaturally. To prevent this time delay, the reverse playback operation should be carried out by decoding only one frame for each picture to be displayed as in a normal playback operation. According to the previously suggested method, such a reverse playback operation requires an increase in the size of the frame memory over the three sections of frame memory 16a, 16b and 16c which are required for normal playback.

According to the present invention, in a reverse playback operation only one frame is decoded for each picture as in a normal playback operation. Thus, the same number of frame memory sections is needed for reverse playback as in a normal playback operation. The reverse playback operation according to the present invention is carried out as follows.

Each time the last picture of a GOP is read out in a reverse playback operation, the flow of the operation jumps to the head of the immediately preceding GOP to decode the encoded data. For purposes of the following discussion, for example, demultiplexer 32 outputs the data in the order shown in FIG. 4A.

Picture header detector 34 detects information indicating whether the picture is an I, P or B picture. In a reverse playback operation, picture data selecting circuit 35 selects only I and P pictures to be supplied to inverse VLC circuit 11, thus B pictures are not supplied in accordance with the system controller (not shown).

As shown in FIG. 4B, the order of the pictures decoded and written into frame memory bank 16 is $I_{22}$, $P_{25}$, $P_{28}$, $I_{12}$, $P_{15}$, $P_{18}$ . . . and comprises only I and P pictures. The pictures are read out from the frame memory bank in the following order: $P_{28}$, $P_{25}$, $I_{22}$, $P_{18}$, $P_{15}$, $I_{12}$, . . . , as shown in FIG. 4C. The pictures read out are then output to display unit 18. By using only I and P pictures, moving pictures can be displayed during a reverse playback operation using the same frame memory bank as is used for normal playback because three frame memory sections can reproduce the picture even if the read order is different from the write order.

However, when more than three frames of I and P pictures exist in a GOP, the number of frame memory sections is no longer sufficient. In this instance, the flow of the operation must jump to the immediately preceding GOP as soon as picture header detector 34 detects a total of three I and P pictures.

FIG. 2 shows write timing and read timing of the three frame memory sections 16a, 16b and 16c composing frame memory bank 16. To simplify the explanation, the pictures of a GOP written and read in FIG. 2 follow the order of the pictures of the GOP shown in FIG. 4A.

In the timing chart of FIG. 2, a write operation is started at time $t_0$ and ended at $t_1$ to write I picture $I_{32}$, the I picture at the head of a GOP immediately (temporally) following the GOP shown in FIG. 4A, into frame memory 16a. At time t1 a write operation is started and ended at time t2 to write P picture $P_{35}$, which was decoded with reference to I picture $I_{32}$, into frame memory 16b.

At time t2, a write operation is started and ended at time t3 to write P picture $P_{38}$, which was decoded with reference to P picture $P_{35}$, into the frame memory 16c. At a point of time between time t2 and time t3, a read operation to read out P picture $P_{38}$ from frame memory 16c is started. When this read operation is started, one field of P picture $P_{38}$ has been written into frame memory 16c. By setting the read timing behind the write timing by one field, the reading and writing operations can be concurrently carried out on the same frame memory The operation to read out P picture $P_{38}$ from frame memory 16c is ended at a point of time between time t3 and time t4. At time t3, a write operation is started and ended at time t4 to write a decoded I picture $I_{22}$ of an immediately (temporally) preceding GOP into frame memory 16c. While picture data is being read from frame memory 16c, data of a different picture can be written into frame memory 16c because the write timing lags behind the read timing by one field.

Thus, pictures are written into the three frame memory sections 16a, 16b and 16c according to the timing shown in FIG. 2 in the following order: $I_{32}$, $P_{35}$, $P_{38}$, $I_{22}$, $P_{25}$, $P_{28}$, $I_{12}$, $P_{15}$, $P_{18}$, $I_{02}$, $P_{05}$, . . . .

However, the pictures are read out from the three frame memory sections 16a, 16b and 16c in the following order: $P_{38}$, $P_{35}$, $I_{32}$, $P_{28}$, $P_{25}$, $I_{22}$, $P_{18}$, $P_{15}$, $I_{12}$ . . . . The subscripts of greater magnitude appended to the picture symbols I and P indicate more recent pictures and show that a reverse playback operation can be carried out in this manner.

As described above, in a reverse operation in which each picture is decoded only once by using only three frame memory sections, three pictures per GOP can be displayed successively during reverse playback. Therefore, when picture header detector 34 detects the completion of the decoding of three I and P pictures, the flow of the operation jumps to the immediately preceding GOP which is then decoded.

If a GOP has more I and P pictures than the number of frame memory sections, as many pictures as the number of frame memory sections are decoded starting at the head of the GOP. In the above example, three pictures can be decoded.

In a reverse playback operation, the pictures are read out in order from the most recent picture to the least recent picture. This order is ensured through the detection of temporal reference (TR) numbers appended to the pictures. These TR numbers indicate the display order for the pictures and are set at the head of the GOP. The values of the TR numbers range from 0 to 1,023. In this example, the TR numbers are each assumed to be a single-digit number in order to simplify the explanation. When a reverse playback operation is carried out, a number indicating the order in which a GOP is displayed is created. This number is concatenated with a TR number as a second (lower order) digit to create a two-digit (or larger) number to be appended to a picture, as shown in FIG. 2. The number indicating the display order of a GOP is the high-order digit and the TR number is the low order digit(s). This labelling system provides that the order of a picture in a frame memory can be recognized.

Figure 7:
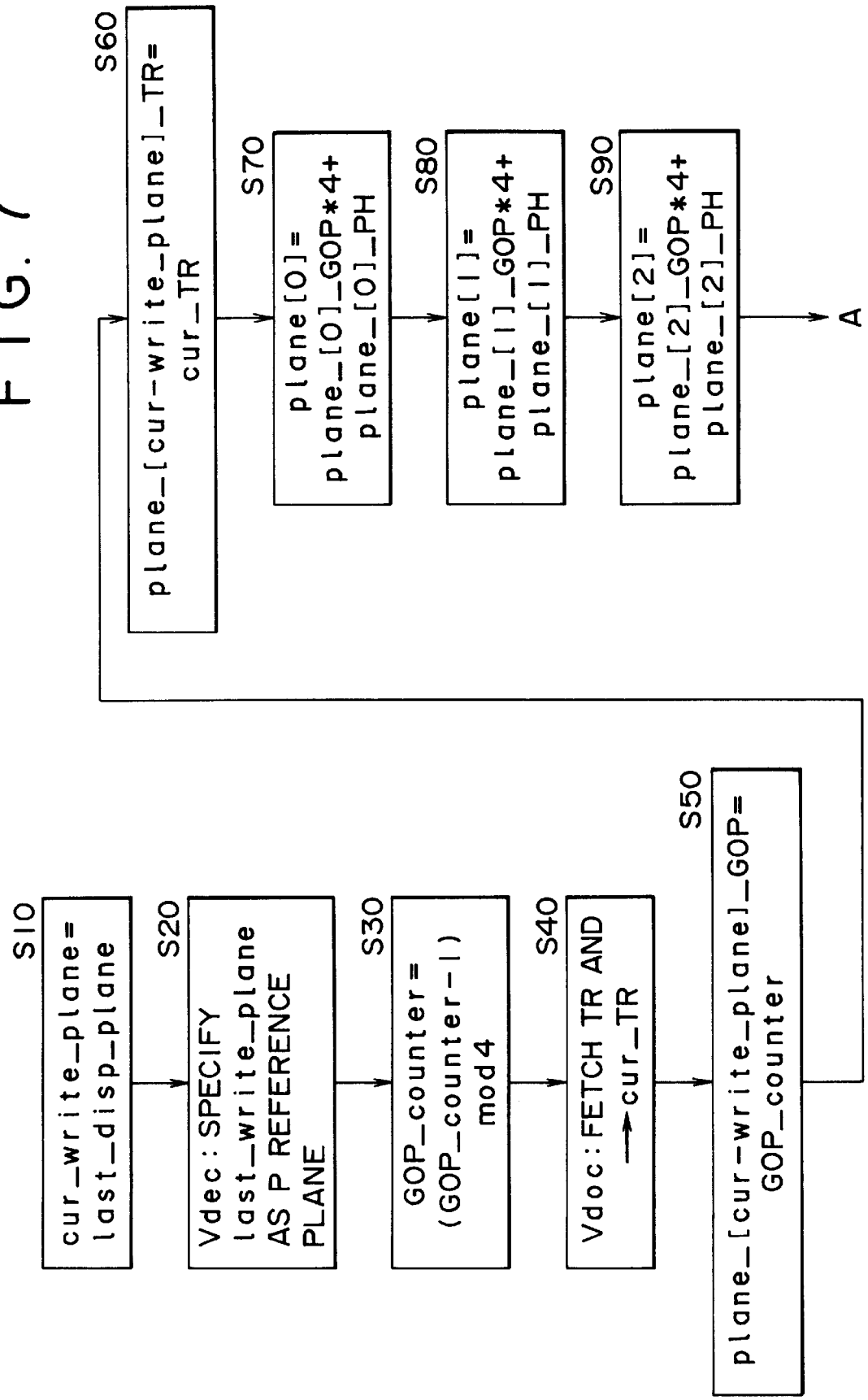
FIG. 7 is a flow chart representing a reverse playback operation for reproducing encoded data according to the present invention.
Figure 9B:
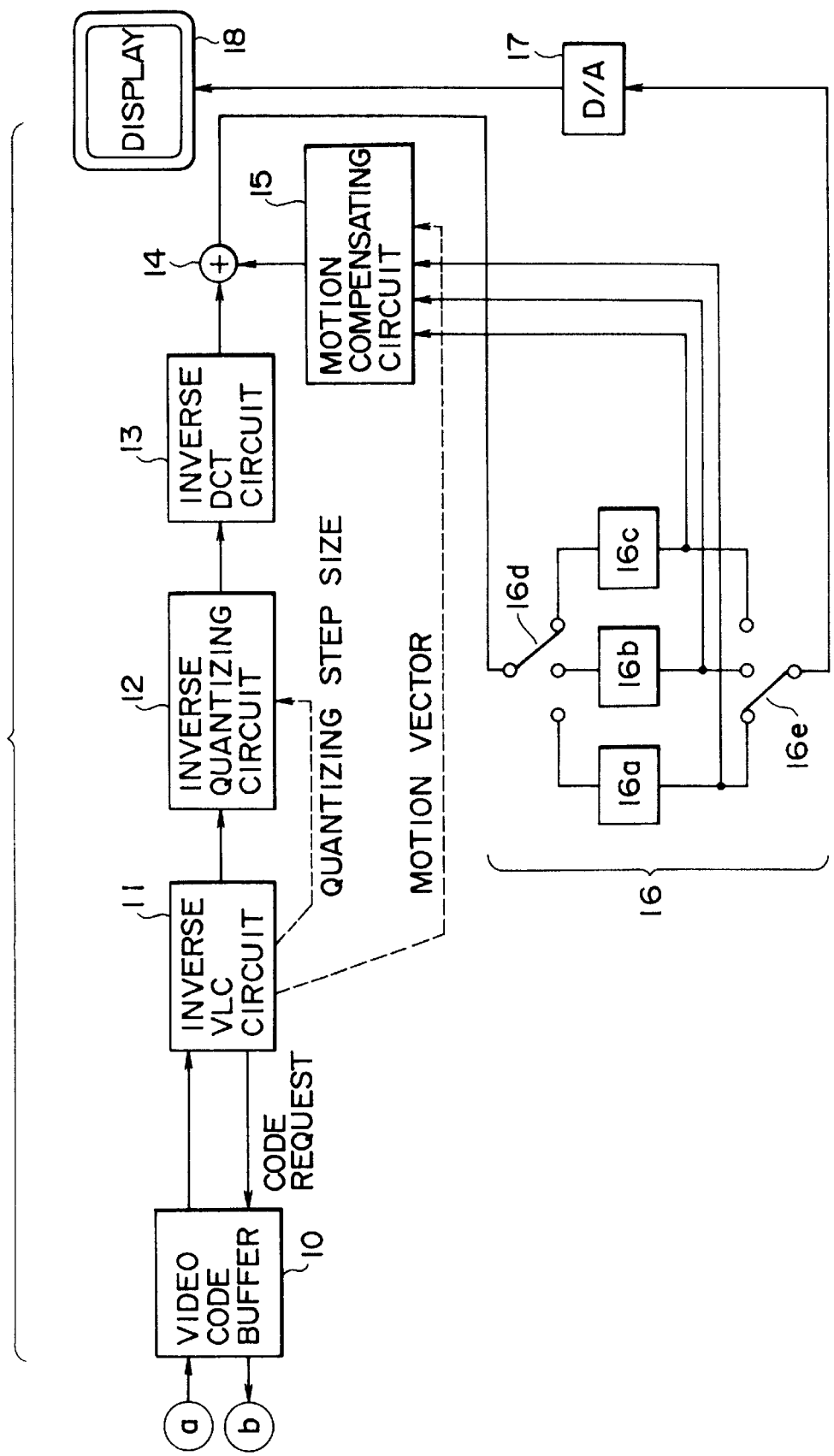

A flow chart of the above operations is shown in FIGS. 7 and 8. At step S10, the plane number of a frame memory section is used as the plane number of the frame memory to be written at this time. Subsequently, at step S20, the plane number which was written previously is specified as the plane number of the picture to be referenced when a P picture is decoded. Thus, the immediately preceding P or I picture is referenced.

At step S30, the value of GOP_counter is decremented by one when an I picture at the head of a GOP is detected The decremented value is then divided by four and the remainder of the division is set as the new value of GOP_counter. By doing so, the value of GOP_counter changes iteratively as follows: 3→2→1→0. The value is appended to a sequentially detected GOP. The value of the divisor does not have to be four; however, the divisor must be a value greater than the number of frame memory sections.

At step S40, a TR number is fetched from the decoder and used as the current TR number. At step S50, the GOP_counter is used as the GOP number of the plane to be written at this time. At step S60, the current TR number is used as the TR number of the plane to be written at this time.

At step S70, an evaluation value is created from the GOP number of plane [0] (corresponding to the frame memory 16a) as the second-order digit and the TR number as the first-order digit. At step S80, another evaluation value is similarly created for plane [1] (corresponding to the frame memory 16b). At step S90, another evaluation value is similarly created for plane [2] (corresponding to the frame memory 16c).

At step S100 (FIG. 8), the evaluation values of planes [0], [1] and [2] are compared to each other to determine which is the largest. If the evaluation value of plane [0] is the largest, cur_disp_plane is set to 0 in step S110. While the evaluation values are being compared to each other, the value of GOP_counter is rotated iteratively.

If the evaluation value of plane [1] is the largest, cur_disp_plane is set to 1 in step S120. If the evaluation value of plane [2] is the largest, cur_disp_plane is set to 2 in step S130.

At step S140, the value set in cur_disp_plane is specified as the number of a display plane which has been decoded and is to be displayed at this time. Step 140 completes the operation.

According to this operation, a display order number is assigned to a picture stored in each frame memory. By displaying pictures in a decreasing order starting with the one having the largest display order number, a reverse playback operation can be carried out. Once displayed, the contents of a frame memory are no longer needed and a newly decoded I or P picture can be stored in that frame memory section.

In the embodiment described above, the frames to be displayed are moved forward each individual frame period in a reverse playback operation. However, no data is supplied to picture header detector 34 from video code buffer 10 while data is being decoded in video decoder 20.

Accordingly, the picture header detector cannot detect a picture header. In the previous embodiment, once three I and P pictures in a GOP are decoded, pickup 2 jumps to the head of an immediately preceding GOP. However, to determine that three I and P pictures were decoded, a next picture header must be detected after the picture headers of the three decoded I and P pictures have been detected.

Therefore, even though ring buffer 5 exists, the decode and search operations are not carried out concurrently. Accordingly, while the previous GOP is being searched, the apparatus remains in a wait state. In the wait state, the last picture displayed is repeatedly displayed because the updating operation of the picture has been halted. This type of display is not pleasing to the eye of the viewer.

Another embodiment of the invention for reproducing encoded data is provided to solve this problem. A block diagram of the circuit configuration for this embodiment is shown in FIGS. 5A and 5B.

This embodiment employs a stream detector 40 between ECC circuit 33 and control circuit 6. In a reverse playback operation, the stream detector detects the picture type from stream data read from optical disc 1. The detected picture type is supplied to the control circuit which selects only I and P pictures. Only the data of the selected I and P pictures is written to the ring buffer.

Thus, three I and P pictures starting with the picture at the head of a GOP are written to the ring buffer at high speed. This data is read out by video decoder 20 according to a timing that makes the data available when it is needed The operation of this embodiment generally prevents a wait state from occurring during a reverse playback operation even if there are only three frame memory sections.

FIGS. 6A and 6B show the configuration of a modified version of the embodiment discussed with reference to FIGS. 5A and 5B.

This modified embodiment, shown in FIGS. 6A and 6B, employs a stream detector 140 which has a different function than stream detector 40 from FIG. 5A and is provided between ECC circuit 33 and ring buffer 5. In a reverse playback operation, stream detector 140 detects only I and P pictures from the stream of data read from optical disc 1. The detected I and P pictures are written to the ring buffer under the control of control circuit 6. Once three I or P pictures have been detected and written from each GOP, pickup 2 is controlled to jump to the immediately preceding GOP to read the next set of data.

Thus, three I and P pictures starting with the picture at the head of a GOP can be written to the ring buffer at high speed. This data can then be read out by video decoder 20 according to a timing that makes the data available when it is needed. The operation of this modified version generally prevents the generation of a wait state in a reverse playback operation even if there are only three frame memory sections.

In the description given so far, the number of memory frame sections in frame memory bank 16 is three. However, the number frame memory sections which constitute the frame memory bank is not limited to three. There can be any number of frame memory sections. A reverse playback operation can be carried out by decoding as many I and P pictures as there are frame memory sections.

In the embodiments described above, I and P pictures were decoded starting with an I picture at the head of the GOP; however, in the reverse playback operation the decoding can start with any arbitrary I picture, for example, when a GOP does not have a header.

A reverse playback operation can be carried out according to the present invention by using only the number of frame memory sections required for a normal playback operation. Thus, a special playback apparatus capable of performing the reverse playback operation can be provided at low cost. Since special playback operations, such as reverse playback, can be implemented in a small scale circuit, the size of circuit boards and, thus, the playback apparatus can be reduced.

In addition, the amount of power consumed is reduced, so the amount of heat dissipated is at a minimum. Thus, the circuit for radiating the dissipated heat can also be minimized.

Therefore, a reverse playback operation can be implemented even in portable playback apparatus.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims. For example, the recording medium could be an optical disc, a magnetic disc or another suitable medium.

We claim:

1. A playback method for reproducing from a recording medium in a reverse playback operation encoded data generated by time-compression using frame correlation over a plurality of frames, said encoded data containing plural groups of pictures, each group of pictures including intraframe and forward-predictive encoded data frames, said method comprising the steps of:

reading said encoded data from said recording medium;

decoding said encoded data;

receiving decoded data into a frame memory bank which is divided into multiple frame memory sections, said decoding step including providing the number of the intraframe and forward-predictive encoded data frames in said each group of pictures and selectively decoding as many of the intraframe and forward-predictive encoded data frames from said each group of pictures as there are said frame memory sections such that each respective frame memory section stores one decoded data frame that corresponds to a respective intraframe or forward-predictive encoded data frame and such that in said each group of pictures the number of intraframe and forward-predictive encoded data frames that exceed the number of frame memory sections are not decoded; and reproducing said decoded data from said frame memory sections.

2. A playback method according to claim 1, wherein said decoding starts at a head of each group of pictures.

3. A playback method according to claim 1, wherein said decoding starts with any intraframe encoded data frame read from said recording medium.

4. A playback method according to claim 1, further comprising the steps of:

saving said encoded data read from said recording medium in a buffer before it is decoded, wherein only as many of the intraframe or forward-predictive encoded data frames from said each group of pictures as there are said frame memory sections are saved in said buffer.

5. A playback method according to claim 1, wherein each group of pictures further includes a header, and said method further comprises the steps of:

detecting picture type header information from said header in each group of pictures; and selecting the data to be decoded based on said picture type header information.

6. A playback apparatus for reproducing from a recording medium in a reverse playback operation encoded data generated by time-compression using frame correlation over a plurality of frames, said encoded data containing plural groups of pictures, each group of pictures including intraframe and forward-predictive encoded data frames, said apparatus comprising:

reading means for reading said encoded data from said recording medium;

decoding means for decoding said encoded data;

a frame memory bank divided into multiple frame memory sections for receiving decoded data from said decoding means, said decoding means providing the number of the intraframe and forward-predictive encoded data frames in said each group of pictures and selectively decoding as many of the intraframe and forward-predictive encoded data frames from said each group of pictures as there are said frame memory sections such that each respective frame memory section stores one decoded data frame that corresponds to a respective intraframe or forward-predictive encoded data frame and such that in said each group of pictures the number of intraframe and forward-predictive encoded data frames that exceed the number of frame memory sections are not decoded; and reproducing means for reproducing said decoded data from said frame memory sections.

7. A playback apparatus according to claim 6, wherein said recording medium is an optical disc.

8. A playback apparatus according to claim 6, wherein said recording medium is a magnetic disc.

9. A playback apparatus according to claim 6, further comprising:

picture type detector means for detecting a picture type of said encoded data read from said recording medium; and selection means for selecting only the intraframe and forward-predictive encoded data frames from said each group of pictures during a special playback mode, and for supplying the selected intraframe and forward-predictive encoded data frames to said decoding means.

10. A playback apparatus according to claim 6, wherein said decoding means starts decoding at a head of said group of pictures.

11. A playback apparatus according to claim 6, wherein said decoding means starts decoding with any intraframe encoded data frame read from said recording medium.

12. A playback apparatus according to claim 6, further comprising:

stream detector means for detecting picture types of said encoded data read from said recording medium; and a buffer controlled in response to an output of said stream detector means for selectively storing as many of the intraframe and forward-predictive encoded data frames from said each group of pictures as there are said frame memory sections.

13. A playback apparatus according to claim 12, wherein said buffer is controlled to store data starting with a head of said group of pictures.

14. A playback apparatus according to claim 12, wherein said buffer is controlled to store data starting with any intraframe predictive encoded data frame read from said recording medium.

15. An apparatus for reproducing from a recording medium in a reverse playback operation encoded data generated by time-compression using frame correlation over a plurality of frames, said encoded data containing plural groups of pictures, in which each group includes intraframe and forward-predictive encoded data frames, said apparatus comprising:

reading means for reading said encoded data from said recording medium;

decoding means for decoding said encoded data;

a frame memory bank divided into a plurality N of frame memory sections for receiving decoded data from said decoding means, said decoding means selectively decoding only N number of the intraframe and forward-predictive encoded data frames from a group of pictures such that each respective frame memory section stores one decoded data frame that corresponds to a respective intraframe or forward-predictive encoded data frame and such that in said group of pictures the number of intraframe and forward-predictive encoded data frames that exceed the number N of frame memory sections are not decoded; and reproducing means for reproducing said decoded data from said frame memory sections.

16. A method for reproducing from a recording medium in a reverse playback operation encoded data generated by time-compression using frame correlation over a plurality of frames, said encoded data containing plural groups of pictures, in which each group includes intraframe and forward-predictive encoded data frames, said method comprising the steps of:

reading said encoded data from said recording medium;

decoding said encoded data;

receiving decoded data into a frame memory bank which is divided into a plurality N of frame memory sections, said decoding step including selectively decoding only N number of the intraframe and forward-predictive encoded data frames from a group of pictures such that each respective frame memory section stores one decoded data frame that corresponds to a respective intraframe or forward-predictive encoded data frame and such that in said group of pictures the number of intraframe and forward-predictive encoded data frames that exceed the number N of frame memory sections are not decoded; and reproducing said decoded data from said frame memory sections.

* * * * *